United States Patent [19]

Ferguson

[11] 4,100,676
[45] Jul. 18, 1978

[54] PIZZA CUTTING BOARD

[76] Inventor: Robert H. Ferguson, 311 S. Windsor Dr., Arlington Heights, Ill. 60004

[21] Appl. No.: 789,210

[22] Filed: Apr. 20, 1977

[51] Int. Cl.² .............................................. B26B 29/00
[52] U.S. Cl. ......................................... 30/292; 30/114;
    30/124; 33/1 F; 33/174 T; 269/295; 269/302.1
[58] Field of Search .................... 30/292, 114, 124;
    269/302.1, 295; 33/1 F, 174 T

[56] References Cited
U.S. PATENT DOCUMENTS

| | | | |
|---|---|---|---|
| 2,041,240 | 5/1936 | Gluesing | 30/292 UX |
| 3,060,838 | 10/1962 | Priore | 30/114 X |
| 3,576,148 | 4/1971 | Katz | 30/292 X |
| 3,639,981 | 2/1972 | Nowensky | 30/124 X |
| 3,787,968 | 1/1974 | Littmann | 30/292 X |

Primary Examiner—Al Lawrence Smith
Assistant Examiner—J. T. Zatarga
Attorney, Agent, or Firm—Wegner, Stellman, McCord, Wiles & Wood

[57] ABSTRACT

In a cutting device and, in particular, a device for cutting a flat object, such as a pizza, or the like, a base is provided which has two oppositely facing flat surfaces thereon. Each of the flat surfaces has scribed therein a plurality of straight slots which intersect to subdivide the surface into a plurality of segments. The segments may be pie-shaped, square, rectangular, or the like. A cutting instrument is drawn through each slot on one of said surfaces to cut a superimposed flat object, such as a pizza, into pieces.

2 Claims, 7 Drawing Figures

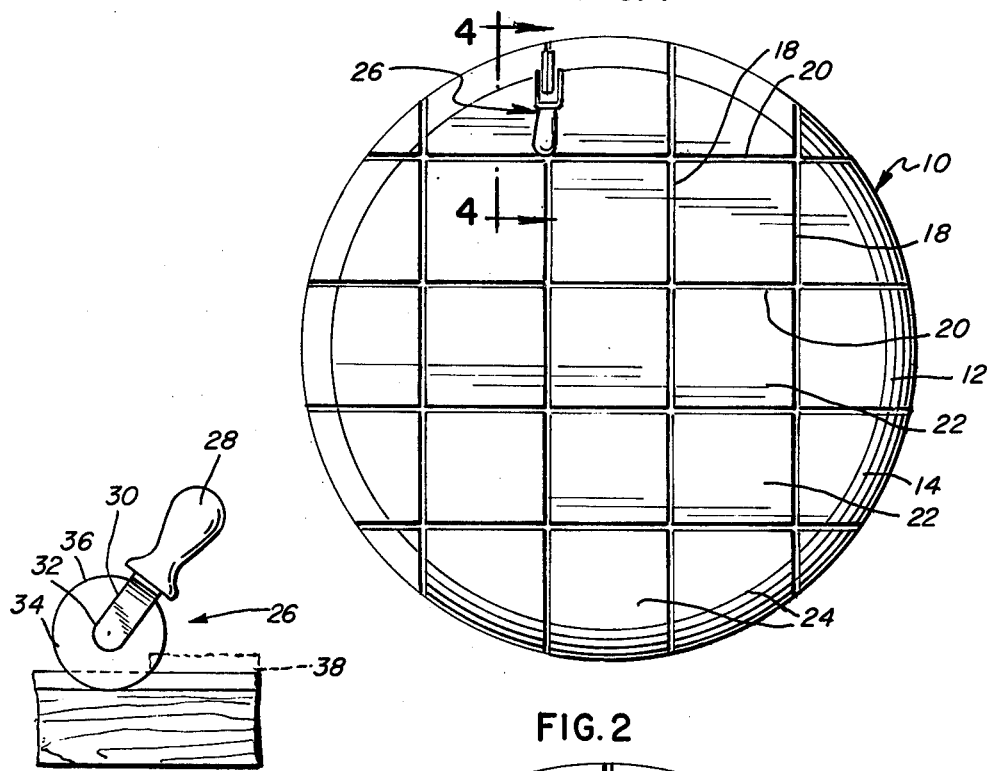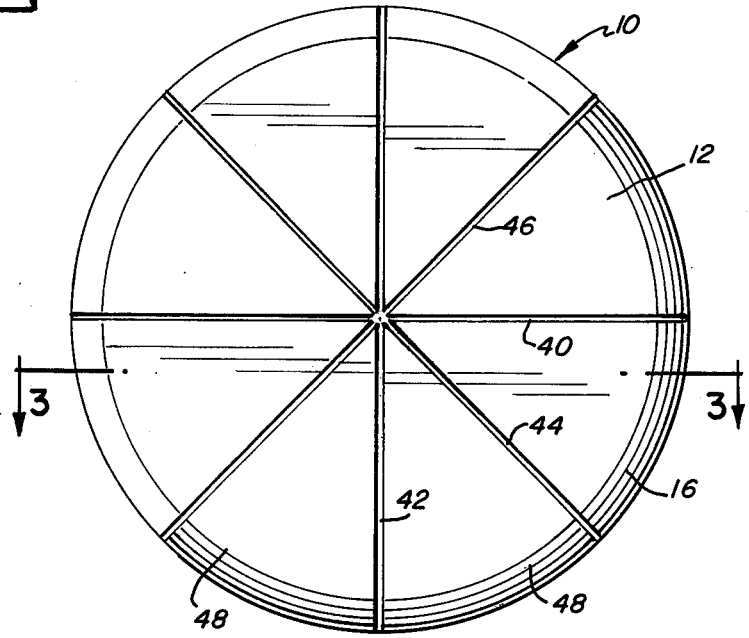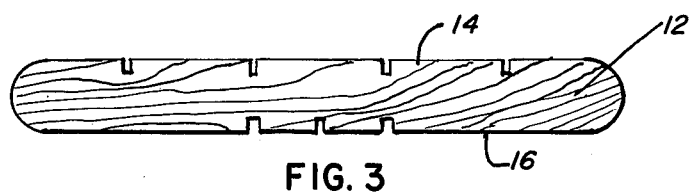

U.S. Patent   July 18, 1978   Sheet 2 of 2   4,100,676
FIG. 5
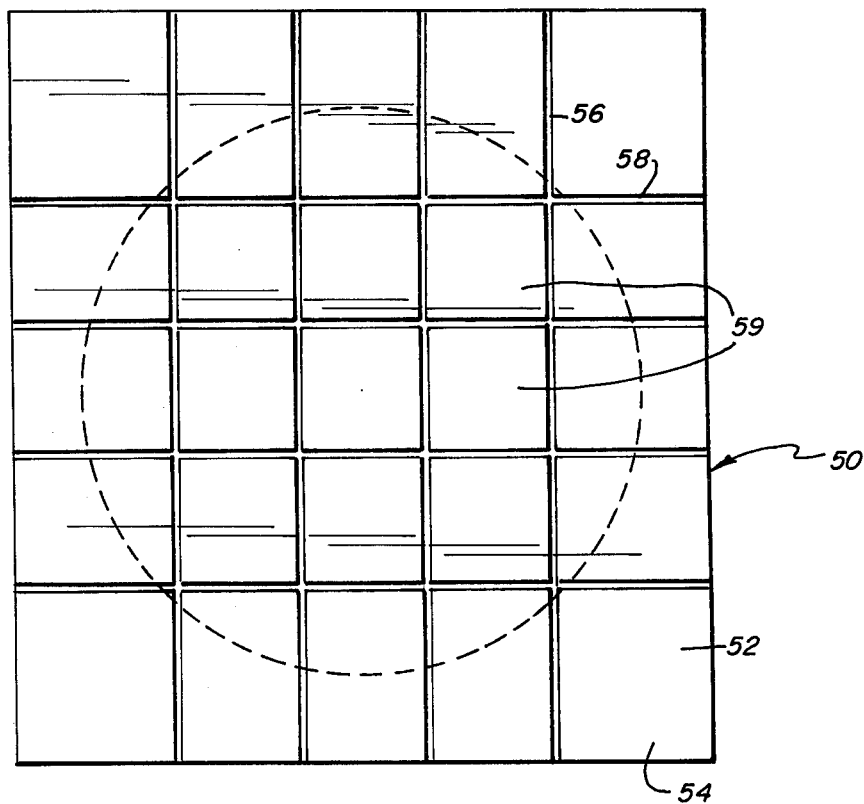
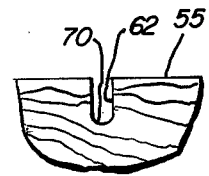
FIG. 7
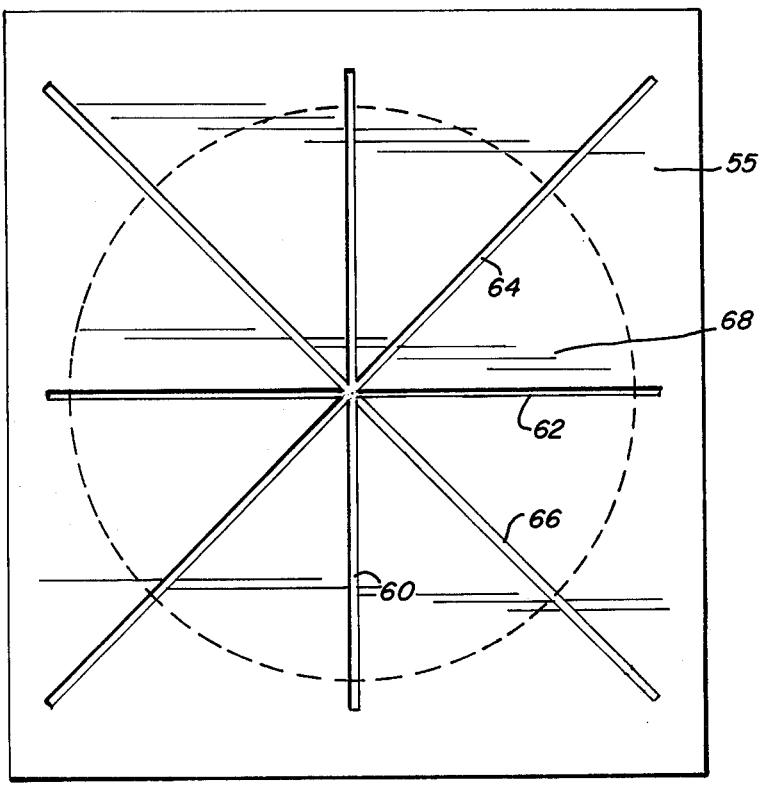
FIG. 6

PIZZA CUTTING BOARD

BACKGROUND OF THE INVENTION

1. Field of the Invention

This invention is directed to a cutting device and, more particularly, to a cutting device for cleanly cutting a flat item into two or more segments or parts.

2. Description of the Prior Art

Currently, to cut a pizza, a knife or roller is pressed down on a surface and drawn across the pizza, presumably to subdivide the pizza into parts. More often than not, the pizza crust and its filling are not cut all the way through so that upon trying to lift a piece of pizza to eat, or the like, it sticks to the adjacent piece or pieces leaving along tails and generally a sticky mess.

Proposals have been made to attempt to cleanly cut through a pizza, such as is shown in the Welsh U.S. Pat. No. 2,906,020 issued Sept. 29, 1959. Welsh shows a segmented base with a unitary cutter having blades matching the dividing partitions in the base so that a pizza placed on the base is cut with one pass of the cutter through the pizza and into the base. The Welsh device is complicated, bulky and relatively expensive. The Welsh cutter would have use primarily in an area where a large number of pizzas would be cut, such as in a pizza restaurant, and must be disassembled for cleaning.

Another device is shown by Nowensky, U.S. Pat. No. 3,639,981, issued Feb. 8, 1972, wherein a base is provided with a single slot. An upstanding post is fastened to the base to which post is pivotally supported a straight edge cutter for making one cut in a pizza placed over the slot in the base. The pizza must then be turned and another cut made therein. This procedure is repeated until the pizza is completely subdivided as desired. The Nowensky device is relatively complicated and expensive.

SUMMARY OF THE INVENTION

I have invented a cutting device that overcomes the problems of the prior art, is simple in construction and is relatively inexpensive to make and to use.

My improved cutting device includes a base that has a pair of oppositely facing flat surfaces thereon. A plurality of slots are formed in each flat surface with the orientation of the slots on each side being different. The slots are a width and depth so as to coact with a cutting instrument to produce a clean and complete cut through a flat object, such as a pizza. Repeating the use of the cutter through all of the slots produces a subdivided pizza ready to serve without the pieces clinging or hanging together due to an incomplete cut.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a plan view of one flat surface of my improved pizza cutting device subdivided into square segments;

FIG. 2 is a plan view of the other flat surface of the device of FIG. 1 subdivided into pie-shaped segments;

FIG. 3 is a cross-sectional view taken along the line 3—3 of FIG. 2;

FIG. 4 is a partial cross-sectional view taken along the line 4—4 of FIG. 1 showing a cutting instrument in one of the slots;

FIG. 5 is a plan view of one side of a modified form of my invention;

FIG. 6 is a plan view of the other side of the modified form of my invention shown in FIG. 5; and FIG. 7 is a broken away view in cross section taken through a modified form of slot.

DESCRIPTION OF THE PREFERRED EMBODIMENT

Referring to the drawings where like reference numerals refer to like parts throughout, one preferred form of the invention is shown in FIGS. 1 through 4 wherein a cutting device 10 is illustrated as comprising a base 12, which is circular in configuration, and has a pair of oppositely facing, substantially flat surface portions 14 and 16. The base 12 may be made of wood, plastic or the like, and should be sufficiently thick to be substantially rigid even after it has been slotted as will be described hereinafter.

FIG. 1 illustrates the plan view of one flat surface 14 which has formed therein a plurality of slots or cutting grooves 18 and 20. Slots 18 are formed substantially parallel to each other and are equally spaced apart. Slots 20, likewise, are parallel to each other, are equally spaced apart and are formed at right angles to the slots 18, the result being that the surface 14 is subdivided into a plurality of substantially equal-sized square segments 22 in the midportion of said surface 14 with the segments 24 around the outer periphery of the surface 14 being of different sizes.

A cutting instrument 26 is illustrated in FIGS. 1 and 4 and, as shown, is a roller-type cutter having a handle 28 connected to a bifurcated mount 30. A pivot 32 passes through the outer end portions of the legs of the mount 30 for supporting the cutting roller 34 between said legs of the mount 30. The cutting instrument 26 is a standard article of manufacture and is just one of many cutting instruments that can be used with the present invention. With the cutting roller 34 of the cutting instrument 26 positioned in one of the slots or grooves 18 or 20, the depth of the groove will extend up, past a segment of the cutting roller 34 with the side edges of the cutting roller being located relatively close to the side walls of each slot 18 and/or 20. The cutting roller 34 is guided by the slot or groove 18 so that the cutting edge 36 of the roller will pass completely through a flat article, such as a pizza 38, shown in dotted lines in FIG. 4, placed on the cutting board so that the cut formed in the flat object or pizza 38 will be a clean, complete cut, all the way through the object or pizza. By drawing the cutting instrument 26 through each slot or groove 18 and each slot or groove 20, a pizza or flat object held on the cutting device 10 will be subdivided into a plurality of segments 22 and 24. The flat object or pizza can then be slid off the cutting device 10 onto a serving plate or a cardboard backing member for immediate use or for transport to a place of use.

The diameter of the base 12 is such that several different diametered flat objects, or pizzas 38, can be placed thereon for cutting. As an example, the base 12 can have a fourteen inch diameter so that pizzas of six, eight, ten, twelve or fourteen inch diameters can be cut thereon. The only criterion being to substantially center the pizza on the board prior to commencing the cutting operation.

FIG. 2 illustrates the other flat surface 16 of the base 12, which surface 16 has a plurality of slots 40, 42, 44, 46 formed therein. Slot 40 is formed along a diameter completely across the surface 16. Slot 42 is formed along a diameter and intersects slot 40 at right angles at a midportion of the surface 16. Slot 44 is formed along a diameter midway between slots 40 and 42 to divide the area between those two slots. Slot 46 is formed along a diameter at right angles to the slot 44 and subdivides the area between the slots 40 and 42, not divided by slot 44. All of the slots 40, 42, 44, 46 intersect at a common point substantially at the midportion of the surface 16 and subdivide the surface 16 into a plurality of substantially equally-sized, pie-shaped segments 48. Although we have described an eight-segment cut, it is to be understood that the number of segments could vary anywhere from four on up to 12, 16 or the like. Once again, the slots 40, 42, 44, 46 are made deep enough into the base 12 so that a cutting instrument 26 placed in any one of said slots or grooves extends down into the base 12 a sufficient depth to effect a completely clean cut through a flat article or pizza 38 placed on the surface 16. A pizza placed on the surface 16 can be subdivided into a plurality of equally-sized, pie-shaped segments 48 by drawing the cutting device 26 along each of the slots 40, 42, 44, 46 until the pizza is completely cut. The pizza can then be slid off the base 12 onto a plate or cardboard carrying member as discussed hereinabove.

FIGS. 5 and 6 show a modified form 50 of my cutting device wherein a base 52 is formed in a square or rectangular shape. The base 52 has a pair of oppositely facing, substantially flat surfaces 54, 55 and is of a sufficient thickness to be substantially rigid even after the slots or grooves have been formed therein.

Surface 54 has a plurality of slots or grooves 56, 58 formed therein with the slots 56 being perpendicular to the slots 58. The slots 56 are parallel to each other and are equally spaced apart and with slots 58, likewise, being parallel to each other and being spaced apart an equal distance, produce a plurality of segments 59.

Surface 55 has a plurality of radial slots 60, 62, 64, 66 formed therein. Slots 60 and 62 lie perpendicular to each other and are positioned to subdivide the segments between slots 60 and 62 into two equal-sized, pie-shaped segments. The result of the location of the radial slots 60, 62, 64, 66 is to subdivide the surface 55 into a plurality of equally-spaced, pie-shaped segments 68.

A pizza or other flat object 38 can be placed on either surface 54 or 55 and by use of a cutter 26, the pizza or flat object can be subdivided either into square-like segments 59 or into pie-shaped segments 68 as desired.

FIG. 7 shows a modified form of slot 62 wherein the root 70 of the slot is circular in cross section to facilitate cleaning the slot after use.

It should be understood that the pattern subscribed by the slots or grooves formed in any of the flat surfaces of the base 12 or 52 could take any pattern desired as long as the slots or grooves are of sufficient depth and width to cooperate with the cutting instrument 26 so that a flat object, such as a pizza, when placed thereon, can be completely and cleanly separated along the path of the slot or groove as the cutting instrument is drawn therethrough. My improved cutting device 50 is relatively inexpensive to manufacture, is simple and cheap to maintain, and is easily scrubbed or cleaned when finished with its use. The board can be hung on a nail by passing an opening through one end of the board, or it can be stored flat or on end taking up a minimum of space. The base can be made of a wood and finished in such a way that the grain shows therethrough in a very attractive manner. Since there are no interconnected parts, it is not necessary to assemble or disassemble the cutting device prior to or after use, nor is it necessary to provide a special large storage place. Although I have described my invention as having square or pie-shaped segments, it is to be understood that the segments could be rectangular, diamond-shaped or any other appropriate shape without departing from my invention.

I claim:

1. In a pizza cutting device comprising a base having a pair of oppositely facing flat surfaces and a plurality of slots formed in each one of said flat surfaces, said slots formed in one of said surfaces pass through a common point located substantially at the midportion of said one surface and some of said slots in the other of said surfaces lie parallel to each other and the remaining slots in said other of said surfaces lie parallel to each other and are perpendicular to and intersect the first-named some of said slots, and hand-drawn cutting means having a cutting edge for cutting said pizza in the pattern established by said slots by drawing said cutting means across said base such that a pizza resting on said surface can be cut by the cutting edge of the cutting means, and said slots in both surfaces are of a width and a depth to coact with said cutting edge of the cutting means to produce a clean and complete cut through the pizza resting on said base.

2. In a pizza cutting device comprising a base having a pair of oppositely facing flat surfaces thereon, one of said surfaces having two sets of slots, one set of said slots being parallel to each other and are equally spaced apart and the other set of said slots in said one surface lie parallel to each other, are equally spaced apart and are perpendicular to and intersect the first-named set of said slots, the other of said surfaces has slots intersecting at a midpoint so as to divide said other surface into a plurality of pie-shaped segments, and a cutting instrument having a roller and a handle, said roller having a cutting edge inserted in one slot at a time and being guided by said slot as said instrument is drawn across said base, such that a pizza resting on said surface can be cut by the cutting edge of the roller, and said slots in both surfaces are of a width and a depth to coact with said cutting edge of the roller to produce a clean and complete cut through the pizza resting on said base.

* * * * *